US011321238B2

(12) United States Patent
Sharma

(10) Patent No.: US 11,321,238 B2
(45) Date of Patent: May 3, 2022

(54) USER PROCESS IDENTIFIER BASED ADDRESS TRANSLATION

(71) Applicant: Micron Technology, Inc., Boise, ID (US)

(72) Inventor: Prateek Sharma, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 16/990,941

(22) Filed: Aug. 11, 2020

(65) Prior Publication Data
US 2022/0050788 A1 Feb. 17, 2022

(51) Int. Cl.
G06F 12/1009 (2016.01)
G06F 12/1045 (2016.01)
G06F 9/54 (2006.01)
G06F 9/455 (2018.01)

(52) U.S. Cl.
CPC ...... *G06F 12/1009* (2013.01); *G06F 9/45558* (2013.01); *G06F 9/546* (2013.01); *G06F 12/1063* (2013.01); *G06F 2009/45583* (2013.01); *G06F 2212/152* (2013.01); *G06F 2212/657* (2013.01)

(58) Field of Classification Search
CPC .. G06F 12/1009; G06F 9/546; G06F 12/1063; G06F 9/45558; G06F 2212/657; G06F 2009/45583; G06F 2212/152
See application file for complete search history.

(56) References Cited

U.S. PATENT DOCUMENTS

| 8,364,933 | B2 | 1/2013 | Herrenschmidt et al. |
| 8,479,264 | B2* | 7/2013 | O'Connor ........... G06F 21/6281 726/4 |
| 9,298,642 | B2 | 3/2016 | Kagan et al. |
| 9,323,692 | B2 | 4/2016 | Bybell et al. |
| 10,635,469 | B2 | 4/2020 | Nair |
| 2015/0370590 | A1* | 12/2015 | Tuch .................... G06F 9/45558 718/1 |
| 2019/0347125 | A1* | 11/2019 | Sankaran ............... G06F 9/3009 |
| 2021/0271481 | A1* | 9/2021 | Tian .................... G06F 9/45558 |

* cited by examiner

*Primary Examiner* — Sean D Rossiter
(74) *Attorney, Agent, or Firm* — Brooks, Cameron & Huebsch, PLLC

(57) ABSTRACT

A processing device of a memory sub-system can receive a first address from a host and can provide the first address to a memory management unit (MMU) for translation. The processing device can also receive a second address from the MMU wherein the second address is translated from the first address. The processing device can further access the memory device utilizing the second address.

19 Claims, 5 Drawing Sheets

US 11,321,238 B2

USER PROCESS IDENTIFIER BASED ADDRESS TRANSLATION

TECHNICAL FIELD

Embodiments of the disclosure relate generally to memory sub-systems, and more specifically, relate to translating addresses utilizing user process identifiers.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
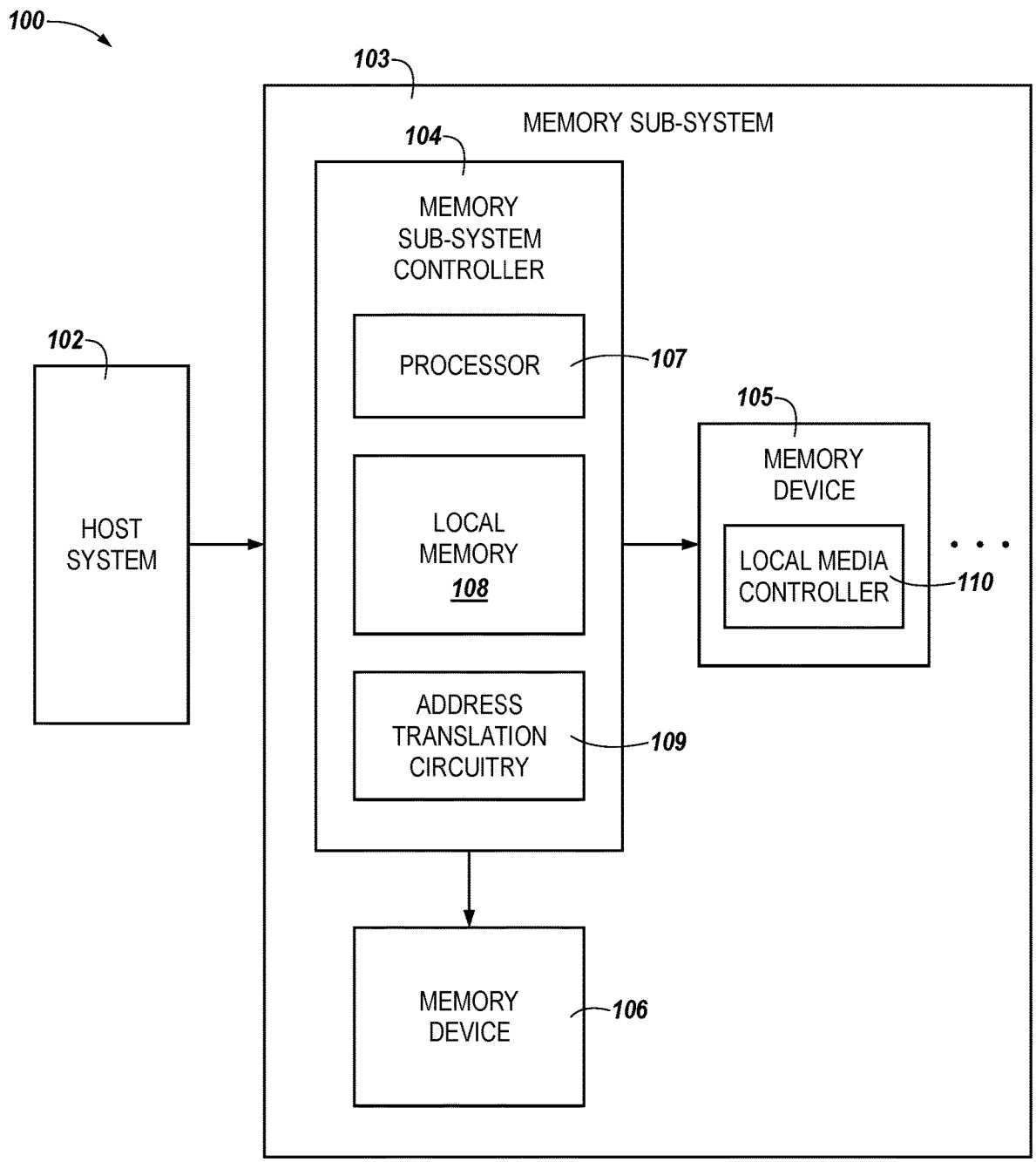
FIG. 1 illustrates an example of a computing system that includes a memory sub-system comprising address translation circuitry in accordance with some embodiments of the present disclosure.

Aspects of the present disclosure are directed to memory sub-systems that translate addresses utilizing user process identifiers. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

The memory devices can include non-volatile memory devices that store data from the host system. A non-volatile memory device is a package of one or more dice. The dice in the packages can be assigned to one or more channels for communicating with a memory sub-system controller. The non-volatile memory devices include cells (i.e., electronic circuits that store information) that are grouped into pages to store bits of data. The non-volatile memory devices can include three-dimensional cross-point ("3D cross-point") memory devices that are a cross-point array of non-volatile memory that can perform bit storage based on a change of bulk resistance, in conjunction with a stackable cross-gridded data access array. Such non-volatile memory devices can group pages across dice and channels to form management units (MUs). A MU can include user data and corresponding metadata. A memory sub-system controller can send and receive user data and corresponding metadata as management units to and from memory devices. Another example of a non-volatile memory device is a negative-and (NAND) memory device. With NAND type memory, pages can be grouped to form blocks. Other examples of non-volatile memory devices are described below in conjunction with FIG. 1.

The term "virtual computing instance" (VCI) covers a range of computing functionality. VCIs may include data compute nodes such as virtual machines (VMs) that run on a hypervisor or container. Containers can run on a host operating system without a hypervisor or separate operating system, such as a container that runs within Linux. A VM refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others.

A host system can execute computer-readable instructions to implement a hypervisor. As used herein, a hypervisor (e.g., virtual machine monitor) can provide virtualization support for a number of VMs and/or containers. A VM can operate as a standalone computing device (e.g., with an operating system, applications, etc.) except that it runs in a virtualized environment provided by the hypervisor. A VM can implement a guest operating system (OS) on the virtualized environment (e.g., virtual hardware). A container can utilize a host OS to provide services to user processes executed on the container. As used herein, user processes applications and/or different types of processes that are executed on a VCI such as a VM and/or a container, among others. Containers can utilize a same host OS to provide resources to the user processes hosted by the containers.

A VM can have virtual system hardware and a guest OS. The virtual system hardware can include at least one virtual central processing unit (CPU), virtual memory, and a number of virtual storage devices. The VM can include the guest OS and a number of drivers as needed for the various virtual storage devices. As used herein, the term "guest" can make reference to components that are part of a VM and/or a container. For example, a host platform (e.g., a computing device) can include an OS that can be referred to as a host OS and a VM can include an OS that can be referred to as a guest OS. As used herein, a driver is software and/or hardware that can be used to control a device. For example, a driver can include software that provides an interface to control and/or manage a lower level interface that corresponds to a hardware device. A driver can also include hardware that controls a physical or virtual hardware device.

Addresses provided by a VM or a container may need to be translated to be used by a memory sub-system to access a memory device. As used herein, a VM and/or a container can be referred to as a virtual environment. The translation of addresses provided by a virtual environment may take place in multiple stages. For example, the guest OS can perform a portion of the translation and a hypervisor may perform a different portion of the translation.

A user process hosted by a guest OS can request access to a memory device utilizing a guest virtual address. The guest virtual address can be translated to a guest physical address by the guest OS. The guest physical address can be provided to the hypervisor. The hypervisor can translate the guest physical address to a system physical address. The system physical address can be provided to a memory device in conjunction with an access command to read data from the memory device or write data to the memory device. The translation from the guest virtual address to the guest physical address and from the guest physical address to the system physical address can be performed by a processing device of the host given that the processing device executes the guest OS, the virtual machine, and/or the hypervisor.

Performing translations of addresses at the hypervisor and the guest OS can yield low performance and/or high latency given that a processing device of the host performs the translations while participating in the control path of the host. Halting execution of the control path to perform address translation can limit the performance of a processing device of the host while providing higher latencies as compared to the latencies of a processing device that does not perform address translation.

Aspects of the present disclosure address the above and other deficiencies by performing the address translation in a memory management unit (MMU) without performing address translation in a hypervisor and/or a host processing device (e.g., CPU). Performing address translation in the MMU can enable a larger scope of virtualization for a memory sub-system. As used herein, an MMU is hardware that performs address translation. The MMU is implemented in a host.

The figures herein follow a numbering convention in which the first digit or digits correspond to the drawing figure number and the remaining digits identify an element or component in the drawing. Similar elements or components between different figures may be identified by the use of similar digits. For example, 109 may reference element "09" in FIG. 1, and a similar element may be referenced as 209 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 illustrates an example of a computing system 100 that includes a memory sub-system 103 in accordance with some embodiments of the present disclosure. The memory sub-system 103 can include media, such as one or more volatile memory devices (e.g., memory device 106), one or more non-volatile memory devices (e.g., memory device 105), or a combination of such.

A memory sub-system 103 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 102 that is coupled to one or more memory sub-systems 103. In some embodiments, the host system 102 is coupled to different types of memory sub-systems 103. FIG. 1 illustrates an example of a host system 102 coupled to one memory sub-system 103. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 102 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 102 uses the memory sub-system 103, for example, to write data to the memory sub-system 103 and read data from the memory sub-system 103.

The host system 102 can be coupled to the memory sub-system 103 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 102 and the memory sub-system 103. The host system 102 can further utilize an NVM Express (NVMe) interface to access components (e.g., memory device 105) when the memory sub-system 103 is coupled with the host system 102 by the PCIe interface. The physical host interface can provide an interface for passing control, address, data, and other signals between the memory sub-system 103 and the host system 102. FIG. 1 illustrates a memory sub-system 103 as an example. In general, the host system 102 can access multiple memory sub-systems via a same communication connection, multiple separate communication connections, and/or a combination of communication connections.

The memory devices 105, 106 can include any combination of the different types of non-volatile memory devices and/or volatile memory devices. The volatile memory devices (e.g., memory device 106) can be, but are not limited to, random access memory (RAM), such as dynamic random access memory (DRAM) and synchronous dynamic random access memory (SDRAM).

Some examples of non-volatile memory devices (e.g., memory device 105) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 105 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 105, 106 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 105, 106 can be grouped as pages that can refer to a logical unit of the memory device used to store data. With some types of memory (e.g., NAND), pages can be grouped to form blocks.

Although non-volatile memory devices such as 3D crosspoint array of non-volatile memory cells and NAND type memory (e.g., 2D NAND, 3D NAND) and 3D cross-point array of non-volatile memory cells are described, the memory device 105 can be based on any other type of non-volatile memory, such as read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 104 (or controller 104 for simplicity) can communicate with the memory devices 105,106 to perform operations such as reading data, writing data, or erasing data at the memory devices 105, 106 and other such operations. The memory sub-system controller 104 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 104 can be a microcontroller, special purpose logic circuitry (e.g., a field programmable gate array (FPGA), an application specific integrated circuit (ASIC), etc.), or other suitable processor.

The memory sub-system controller 104 can include a processor 107 (e.g., a processing device) configured to execute instructions stored in local memory 108. In the illustrated example, the local memory 108 of the memory sub-system controller 104 includes an embedded memory configured to store instructions for performing various processes, operations, logic flows, and routines that control operation of the memory sub-system 103, including handling communications between the memory sub-system 103 and the host system 102.

In some embodiments, the local memory 108 can include memory registers storing memory pointers, fetched data, etc. The local memory 108 can also include read-only memory (ROM) for storing micro-code, for example. While the example memory sub-system 103 in FIG. 1 has been illustrated as including the memory sub-system controller 104, in another embodiment of the present disclosure, a memory sub-system 103 does not include a memory sub-system controller 104, and can instead rely upon external control (e.g., provided by an external host, or by a processor or controller separate from the memory sub-system).

In general, the memory sub-system controller 104 can receive commands or operations from the host system 102 and can convert the commands or operations into instructions or appropriate commands to achieve the desired access to the memory device 105 and/or memory device 106. The memory sub-system controller 104 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 105, 106. The memory sub-system controller 104 can further include host interface circuitry to communicate with the host system 102 via the physical host interface. The host interface circuitry can convert the commands received from the host system into command instructions to access the memory device 105 and the memory device 106 as well as convert responses associated with the memory device 105 and the memory device 106 into information for the host system 102.

The memory sub-system 103 can also include additional circuitry or components that are not illustrated. In some embodiments, the memory sub-system 103 can include a cache or buffer (e.g., DRAM) and address circuitry (e.g., a row decoder and a column decoder) that can receive an address from the memory sub-system controller 104 and decode the address to access the memory devices 105, 106.

In some embodiments, the memory devices 105, 106 include a local media controller 110 that operates in conjunction with memory sub-system controller 104 to execute operations on one or more memory cells of the memory devices 105, 106. An external controller (e.g., memory sub-system controller 104) can externally manage the memory device 105 (e.g., perform media management operations on the memory device 105). In some embodiments, a memory device 105 is a managed memory device, which is a raw memory device combined with a local controller (e.g., local controller 110) for media management within the same memory device package. An example of a managed memory device is a managed NAND (MNAND) device.

The memory sub-system controller 104 can also include address translation circuitry 109. The host system 102 can provide addresses for translation to the memory sub-system 103. The memory sub-system 103 can receive addresses for translation from the host system 102. The addresses for translation can be provided to the memory sub-system controller 104. The addresses can be received at the address translation circuitry 109. The address translation circuitry 109 can cause the addresses to be translated by providing the addresses to an MMU for translation. The MMU can be implemented in the host system 102. The address translation circuitry 109 can receive the addresses from the host 102 without any portion of the translation being performed by the host 102, a memory controller, or a different device prior to the addresses being received by the memory sub-system.

In some embodiments, the memory sub-system controller 104 includes at least a portion of the address translation circuitry 109. For example, the memory sub-system controller 104 can include a processor 107 (processing device) configured to execute instructions stored in local memory 108 for performing the operations described herein. In some embodiments, the address translation circuitry 109 is part of the host system 102, an application, or an operating system.

Responsive to providing the address to be translated to the MMU, the address translation circuitry 109 can receive an address (e.g., translated address) from the MMU. In various examples, the address translation circuitry 109 can provide the translated address to the host 102. The address translation circuitry 109 can also utilize the translated address to access the memory devices 105, 106, for example. Responsive to accessing the memory devices 105, 106 utilizing the translated address, the address translation circuitry 109 can provide the data accessed from the memory devices 105 and/or 106 to the host 102.

Figure 2:
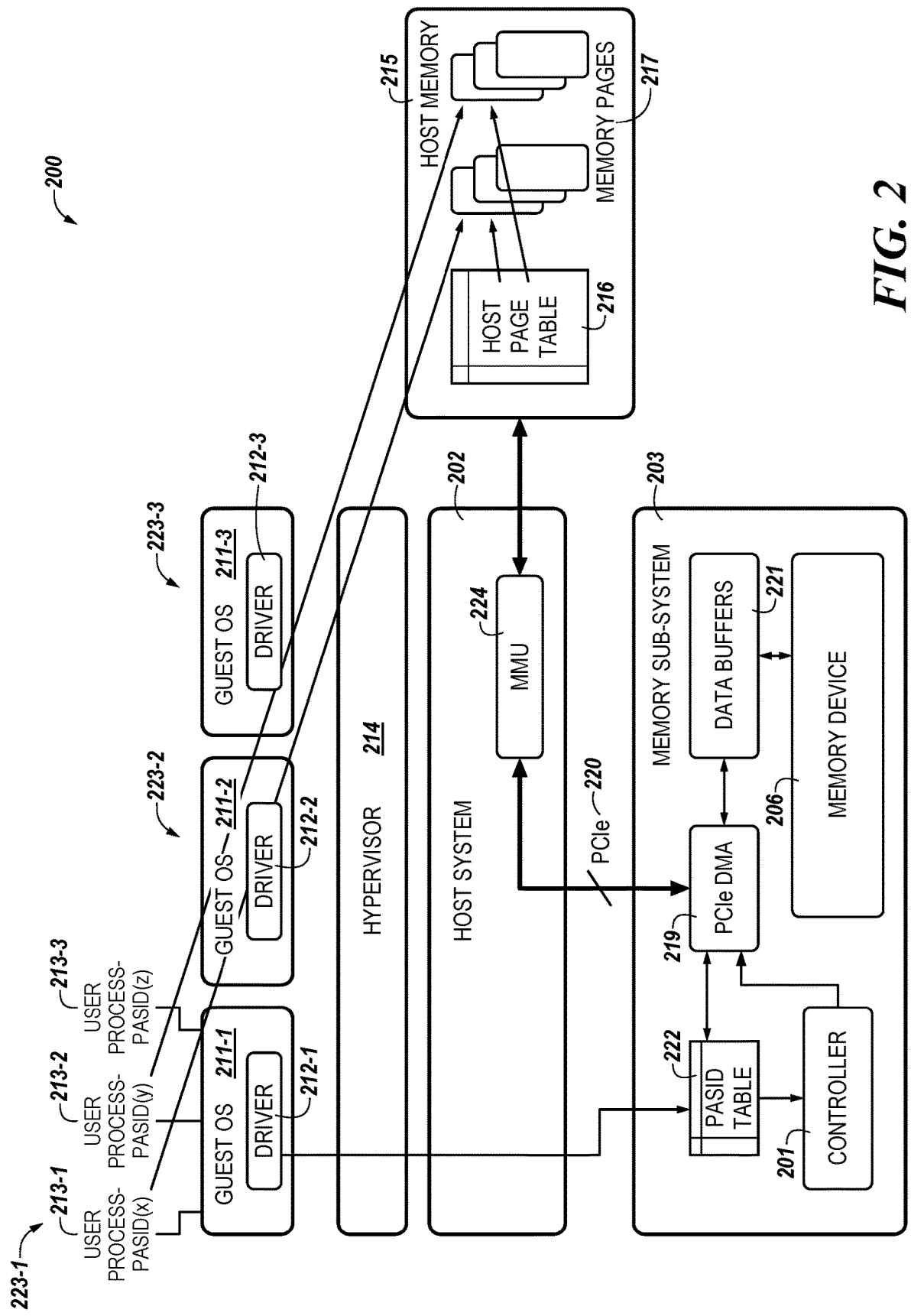
FIG. 2 illustrates an example of a computing system in accordance with some embodiments of the present disclosure.

FIG. 2 illustrates an example of a computing system 200 in accordance with some embodiments of the present disclosure. The computing system 200 includes the host system 202 and the memory sub-system 203. The host system 202 is analogous to host system 102 while the memory sub-system 203 is analogous to the memory sub-system 103 of FIG. 1.

The host system 202 can host a hypervisor 214. The hypervisor 214 can host the VMs 223-1, 223-2, and 223-3. The VMs 223-1, 223-2, and 223-3 can be referred to as VMs 223. The host system 202 can include an MMU 224 and host memory 215. Although the example of FIG. 2 is provided in the context of the hypervisor 214 and the VMs 223, the example of FIG. 2 can also be applicable to containers or different VCI.

Each of the VMs 223 can include a guest OS, a driver, and a number of user processes. For example, the VM 223-1 can include a guest OS 211-1. The guest OS 211-1 can host a driver 212-1. The guest OS 211-1 can also include user process 213-1, user process 213-2, and user process 213-3, among other possible user processes that can be hosted by the guest OS 211-1.

The VM 223-2 includes a guest OS 211-2. The guest OS 211-2 includes a driver 212-2. The VM 223-3 includes a guest OS 211-3. The guest OS 211-3 includes a driver 212-3. Although not shown, each of the guest OSs 211-2, 211-3 includes corresponding user processes. The guest OSs 211-1, 211-2, and 211-3 can be referred to as guest OSs 211. The drivers 212-1, 212-2, and 212-3 can be referred to as drivers 212. The user processes 213-1, 213-2, and 213-3 can be referred to as user processes 213.

The memory sub-system 203 includes a controller 204, a process address space identifier (PASID) table 222, and PCIe direct memory access (DMA) circuitry 219 referred to as PCIe DMA 219. The memory sub-system 203 can also include data buffers 221 and a memory device 206. As used herein, the portions of the controller 204 that are used to perform address translation or are used to cause the addresses to be translated can be referred to as address translation circuitry such as address translation circuitry 109 of FIG. 1.

In various examples, PASIDs can be generated and registered. As used herein, a user process identifier is an identifier that can be used to identify a particular user processes running on a guest OS and/or a host OS. An example of a user process identifier includes a PASID. A PASID is an identifier that enables the sharing of the memory sub-system 203 across the processes 213 while providing each of the processes 213 a virtual address space. The PASIDs can correspond to the user processes 213. Each of the user processes 213 can be assigned a different PASID. For example, the user process 213-1 can be assigned a first PASID (e.g., PASID(x)), the user process 213-2 can be assigned a second PASID (e.g., PASID(y)), and the user process 213-3 can be assigned a third PASID (e.g., PASID(z)). The PASIDs can be used to tag direct memory access requests provided by the user processes 213 and/or direct memory accesses destined for the user processes 213.

Responsive to generating one or more of the user processes 213, the guest OSs 211 or containers (not shown) can cause corresponding drivers 212 to obtain a PASID corresponding to the user processes 213. The drivers 212 can provide commands to the MMU 224 to cause the MMU 224 to generate corresponding PASIDs. The drivers 212 can receive the PASIDs from the MMU 224. In various examples, the drivers 212 can cause a processing device of the host system 202 to provide signals to the MMU 224, where the signals correspond to the commands generated by the drivers 212. The commands provided by the drivers 212 can be provided via the hypervisor 214 to the MMU 224 without the hypervisor modifying the signals.

Responsive to receiving the signals corresponding to the commands generated by the drivers 212, the MMU 224 can generate the corresponding PASIDs and can store the corresponding PASIDs and information used to perform address translation in host memory 215. The host memory 215 can comprise a host page table 216. The host page table 216 can comprise memory pages 217 which can represent data stored in the host memory 215. The memory pages 217 can comprise the PASIDs and additional data utilized to perform address translation. For example, the memory pages 217 can comprise address translations and an association between the address translations and the PASIDs.

The MMU 224 can return PASIDs to the drivers 212 corresponding to the user processes 213. The drivers 212 can then proceed to register the PASIDs with the memory sub-system 203. The drivers 212 can provide commands to the memory sub-system 203 to cause the memory sub-system 203 to store the PASIDs in the PASID table 222. The drivers 212 can also provide IDs of the user processes 213 which can correspond to the PASID. For example, the driver 212-1 can provide a first ID of the user process 213-1 and a corresponding first PASID (e.g., PASID(x)), a second ID of the user process 213-2 and a corresponding second PASID (e.g., PASID(y)), and/or a third ID of the user process 213-3 and a corresponding third PASID (e.g., PASID(z)) to the memory sub-system 203 to register the PASIDs.

The controller 204 can receive the PASIDs. The controller 204 can also receive the corresponding IDs of the user processes 213. Responsive to receipt of the PASIDs the controller 204 can cause the received PASIDs to be stored in the PASID table 222. The controller 204 can also cause the received PASIDs and the corresponding IDs of the user processes 213 to be stored in the PASID table 222. The controller 204 can also assign a queue to each of the PASIDs that is generated. As used herein, a queue is a structure that allows for commands and/or data corresponding to said commands to be stored. The commands that are stored in a queue can be retrieved from the queue and executed by the controller 204. In various examples, the PASIDs, the IDs of the user processes 213, and/or the IDs of the corresponding queues can be stored in the PASID table 222. Storing the PASIDs in the PASIDs table 222 can constitute registering the PASIDs with the memory sub-system 203.

After registering the PASIDs with the memory sub-system 203, the user processes 213 can request the translation of addresses by the memory sub-system 203 and/or can provide access commands and associated addresses to the memory sub-system 203, the execution of which can include the translation of the associated addresses. The controller 204 can receive the access command and/or associated address.

The controller 204 can receive the IDs of the user processes 213, the access command, and/or the addresses corresponding to the access commands. The controller 204 can retrieve the PASIDs corresponding to the ID of a user processes utilizing the IDs of the user processes.

In various examples, the PASIDs can be retrieved utilizing IDs of the queues corresponding to the user processes 213 that provided the PASIDs. For example, an access command or an identifier of the access command can be stored in a queue corresponding to the user process that provided the access command. A PASID corresponding to the queue can be retrieved from the PASID table 222 utilizing the ID of the queue. Regardless of whether a PASID is retrieved utilizing an ID of a process or an ID of a queue, the controller 204 can provide or cause the PASIDs and the corresponding address to be provided to the PCIe DMA 219.

The PCIe DMA 219 can provide the address and the PASID to the MMU 224 utilizing an interface such as a PCIe 220. In various examples, the address can be modified by incorporating the PASID into the address. The PASID can be an address qualifier. The address can also be modified by incorporating the PASID and an ID of a memory sub-system and/or memory device into the address.

The PCIe 220 can be an interface that is not utilized in a control path of the host system 202 such that providing PASIDs and/or addresses to the MMU 224 for translation utilizing the PCIe 220 does not degrade the performance of a processing device of the host system 202.

In examples where there are multiple memory sub-systems, the controller 204 can provide the address, a PASID corresponding to the user process that provided the address, and an ID of the memory sub-system 203 and/or the memory device 206. Providing the ID of the memory sub-system 203 and/or the memory device 206 allows the MMU 224 to translate addresses for multiple memory sub-systems and/or memory devices where the multiple memory sub-systems and/or memory devices utilize a similar addressing scheme. For example, the MMU 224 can translate a first address and a second address differently given that the first address and the second address are associated with different memory sub-systems where the first address and the second address are a same address and both addresses are associated with a same PASID.

The MMU 224 can map virtual addresses to physical addresses. For example, the MMU 224 can map guest virtual addresses to system physical addresses. Mapping guest virtual addresses to system physical addresses can include mapping guest virtual addresses to guest physical addresses and mapping the guest physical addresses to the system physical addresses. In various examples, the MMU 224 can also map the guest physical addresses to the system physical addresses without mapping the guest virtual addresses to the guest physical addresses. The mapping of guest virtual addresses to system physical addresses or the mapping of guest physical addresses to system physical addresses can be referred to as address translation.

Responsive to receipt of an address, a PASID, and/or an ID of the memory sub-system 203 and/or the memory device 206, the MMU 224 can translate the address utilizing the host memory 215. As used herein, the host memory 215 can comprise memory that is internal to the host system 202 and/or is used exclusively by the host system 202. The MMU 224 can utilize the PASID and/or the ID of the memory sub-system 203 and/or the memory device 206 to translate the address utilizing the host page table 216 comprising the memory pages 217.

Responsive to translating the memory address, the MMU 224 can return the translated address to the PCIe DMA 219 utilizing the PCIe 220. The PCIe DMA 219 can utilize the translated address to access the memory device 206. For instance, the translated address can be used to access the memory device 206 to read data from the memory device 206 and/or write data to the memory device 206. The data buffers 221 can be utilized to store the data retrieved from the memory device 206 or to store the data that is to be written to the memory device 206.

In various instances, the controller 204 can provide the address received from the user processes 213 and the queue ID corresponding to the user processes 213 to the PCIe DMA 219. The PCIe DMA 219 can retrieve the PASID corresponding to the queue ID. The PCIe DMA 219 can then provide the PASID, the address, and/or the ID of the memory sub-system 203 and/or the memory device 206 to the MMU 224 as described.

In various examples, the address translation can be performed by the memory sub-system 203 instead of by the MMU 224. For example, receipt of the PASIDs corresponding to the user processes 213 by the memory sub-system 203 for storage in the PASID table 222 can trigger the storage of the corresponding data used to translate addresses associated with the PASID from the host page table 216 comprising the memory pages 217. For instance, responsive to receipt of the PASIDs for storage in the PASID table 222, the controller 204 can cause the PCIe DMA 219 to request the address translations for the PASIDs.

The PCIe DMA 219 can provide the PASIDs to the MMU 224 requesting the address translations corresponding to the PASIDs. The MMU 224 can access the address translations corresponding to the PASIDs from the memory pages 217 and can provide the address translations to the PCIe DMA 219.

The PCIe DMA 219 can store the address translations in memory internal to the memory sub-system 203. For example, the address translations can be stored in the memory device 206, the data buffers 221, and/or a different memory internal to the memory sub-system 203. As used herein, the address translations can include data used to map a first address to a second address.

Subsequent to storing the address translations in memory internal to the memory sub-system 203, the controller 204 can receive memory access commands from the user processes 213 and can receive corresponding addresses. The controller 204 can translate the received addresses, without using a processor of the host system 102, to generate translated addresses. Translating the received addresses can include utilizing a PASID corresponding to the received address and using the received address to access a translated address from the address translations. The controller can translate the received addresses without providing the received addresses to the MMU 224. The controller 204 can then cause the translated addresses to be used to access the memory device 206.

Although the examples described herein are provided in the context of user processes 213 running on VMs 223, the examples described herein can also be implemented utilizing user processes 213 running on containers (not shown). For instance, the user processes 213 can be hosted by a container which is running on a processing device of the host system 202. The drivers 212 can also be running on containers. The drivers 212 running on a container can register the PASIDs corresponding to the user processes 213. The drivers 212 can provide access commands and associated addresses responsive to the user processes 213 requesting access to the memory sub-system 203.

The user processes 213 can be terminated in due course. The drivers 212, for example, can provide signaling to the memory sub-system 203 responsive to the termination of the user processes 213. The signaling can indicate that the user processes 213 have been terminated. The controller 204 can receive the signals indicating that the user processes 213 have been terminated.

Responsive to receipt of the signals, the controller 204 can delete a PASID corresponding to the deleted user process and/or an ID of the queue associated with the deleted user process from the PASID table 222. Deleting an entry in the PASID table 222 corresponding to the PASID of the deleted user process can disassociate the queue corresponding to the deleted user process from the PASID. Disassociating the PASID and a corresponding queue can allow the queue to be associated with a different user process responsive to the creation of a new user process. In various examples, the MMU 224 can also be informed of the termination of the user processes 213 such that the MMU 224 disassociates a PASID from the terminated user processes.

The PASIDs can be provided from the VMs to the memory sub-system 203 to allow for address translation without the utilization of a processor of the host system 202. Translating without utilizing a processor of the host system 202 can enable hardware acceleration.

Figure 3:
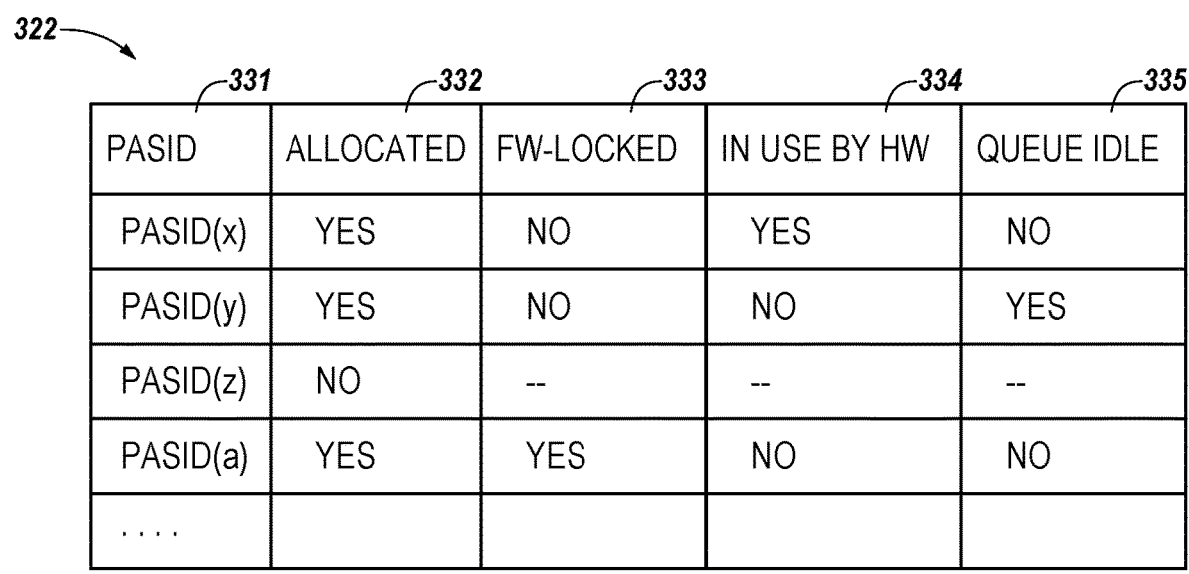
FIG. 3 illustrates an example of a PASID table in accordance with some embodiments of the present disclosure.

FIG. 3 illustrates an example of a PASID table 322 in accordance with some embodiments of the present disclosure. The PASID table 322 can store the PASIDs 331 corresponding to user processes. In various examples, the PASID table 322 can be stored using vendor specific registers among other types of memory incorporated in a memory sub-system.

The PASID table 322 can also define whether the PASIDs 331 have been allocated based on an allocated field 332. Allocating the PASIDs 331 can include associating queues with the PASIDs 331. Although the IDs of the queues are not shown in FIG. 3, the IDs of the queues can also be stored in the PASID table 322. For example, the allocated field 332 can store IDs of the queues such that each PASID 331 is associated with a different queue.

The PASID table 322 can also include a firmware locked field 333. The firmware locked field 333 designates PASIDs to be reserved. The purposes for reserving PASIDs can be vendor specific. The in-use-by hardware field 334 and the queue idle field 335 allow interrupts to be remapped from the memory sub-system to the correct user thread (in association with PASIDs). Translating addresses without use of a processor of the host reduces the need to provide interrupts to the processor. Further, there is no need to interrupt the host processor because the ready/busy status of PASID is maintained by the PASID table 322.

In various examples, the PASID 331 can be used to generate and/or process interrupts. An interrupt can be created when the memory sub-system identifies an irregularity. For instance, a fault can be created if an invalid address is provided. Interrupts can be used to provide information to a source of access commands regarding why the access commands failed. The PASID 331 can be used to identify a queue associated with the interrupt. The queue can be used to identify a user process associated with the queue. Identifying a user process provides the ability to provide the interrupt to the user process.

Figure 4:
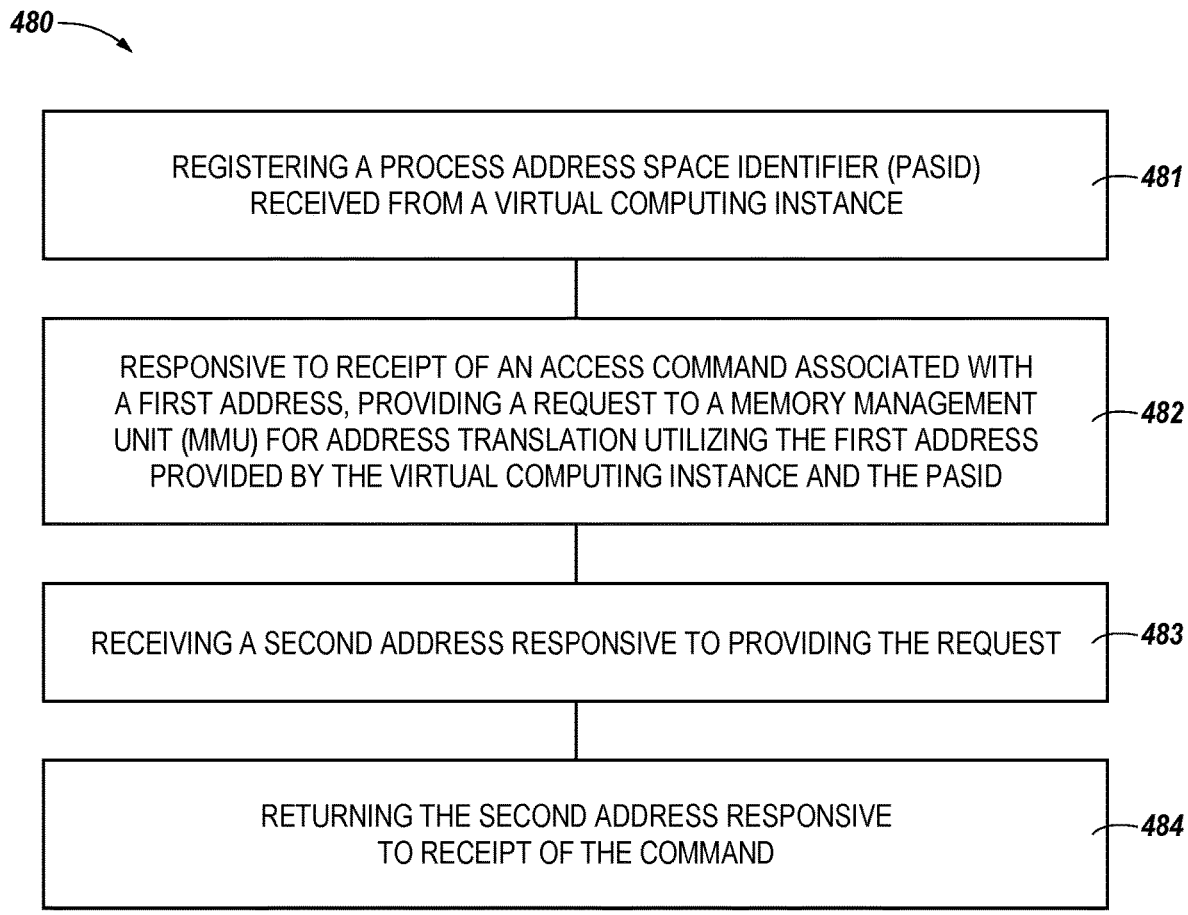
FIG. 4 is a flow diagram of an example of a method for translating addresses in accordance with some embodiments of the present disclosure.

FIG. 4 is a flow diagram of an example of a method 480 corresponding to arbitration circuitry in accordance with some embodiments of the present disclosure. The method 480 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

In some embodiments, the method 480 is performed by the address translation circuitry 109 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 481, a process address space identifier (PASID) received from a virtual computing instance can be registered. Registering the PASID can comprise storing the PASID in a PASID table. At block 482, responsive to receipt of an access command associated with a first address, a request can be provided to an MMU for address translation utilizing the first address provided by the virtual computing instance and the PASID. Responsive to receipt of the command, the PASID can be retrieved from the PASID table prior to providing the request including the PASID. At block 483, a second address can be received responsive to providing the request. At block 484, the second address can be returned responsive to receipt of the command. The second address can be returned from a memory sub-system to the virtual computing instance.

The method can further include storing the second address. Responsive to receipt of additional access commands associated with the first address, the second address can be returned without providing additional requests to the MMU. In various examples, the second address can be cached in the memory sub-system to allow the memory sub-system to provide the second address without requesting the second address form the MMU via address translation utilizing the first address. For example, the first address and the second address can be stored by the memory sub-system such that the second address can be retrieved utilizing the first address.

Figure 5:
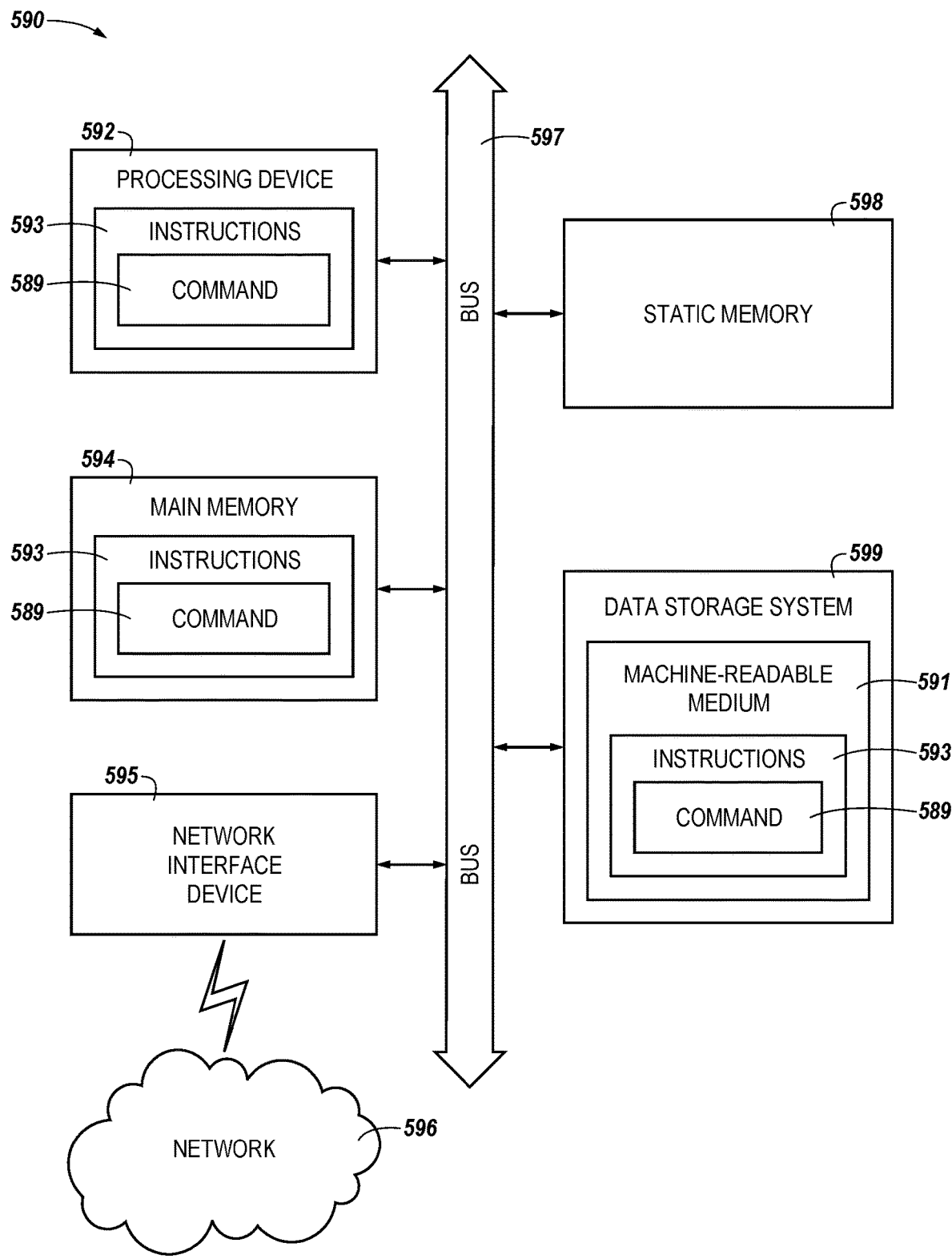
FIG. 5 is a block diagram of an example of a computer system in which embodiments of the present disclosure may operate.

FIG. 5 illustrates an example of a machine of a computer system 590 within which a set of instructions, for causing the machine to perform one or more of the methodologies discussed herein, can be executed. In some embodiments, the computer system 590 can correspond to a host system (e.g., the host system 102 of FIG. 1) that includes, is coupled to, or utilizes a memory sub-system (e.g., the memory sub-system 103 of FIG. 1) or can be used to perform the operations of a controller (e.g., to execute an operating system to perform operations corresponding to the address translation circuitry 109 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or another machine capable of executing a set of instructions (sequential or otherwise) that specify actions to be taken by that machine. Further, while a single machine is illustrated, the term "machine" shall also be taken to include a collection of machines that individually or jointly execute a set (or multiple sets) of instructions to perform one or more of the methodologies discussed herein.

The example computer system 590 includes a processing device 592, a main memory 594 (e.g., read-only memory (ROM), flash memory, dynamic random access memory (DRAM) such as synchronous DRAM (SDRAM) or Rambus DRAM (RDRAM), etc.), a static memory 598 (e.g., flash memory, static random access memory (SRAM), etc.), and a data storage system 599, which communicate with each other via a bus 597.

The processing device 592 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 592 can also be one or more special-purpose processing devices such as an application specific integrated circuit (ASIC), a field programmable gate array (FPGA), a digital signal processor (DSP), network processor, or the like. The processing device 592 is configured to execute instructions 593 for performing the operations and steps discussed herein. The computer system 590 can further include a network interface device 595 to communicate over the network 596.

The data storage system 599 can include a machine-readable storage medium 591 (also known as a computer-readable medium) on which is stored one or more sets of instructions 593 or software embodying one or more of the methodologies or functions described herein. In various examples, the machine-readable storage medium 591 can be non-transitory. The instructions 593 can also reside, completely or at least partially, within the main memory 594 and/or within the processing device 592 during execution thereof by the computer system 590, the main memory 594 and the processing device 592 also constituting machine-readable storage media. The machine-readable storage medium 591, data storage system 599, and/or main memory 594 can correspond to the memory sub-system 103 of FIG. 1.

In one embodiment, the instructions 593 include instructions to implement functionality corresponding to the address translation circuitry 109 of FIG. 1. The instructions can include a command instruction 589 associated with translating addresses in a memory sub-system (e.g., address translation circuitry 109 in FIG. 1). While the machine-readable storage medium 591 is shown in an example embodiment to be a single medium, the term "machine-readable storage medium" should be taken to include a single medium or multiple media that store the one or more sets of instructions. The term "machine-readable storage medium" shall also be taken to include a medium that is capable of storing or encoding a set of instructions for execution by the machine and that cause the machine to perform one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, types of disk including floppy disks, optical disks, CD-ROMs, and magnetic-optical disks, read-only memories (ROMs), random access memories (RAMs), EPROMs, EEPROMs, magnetic or optical cards, or type of media suitable for storing electronic instructions, each coupled to a computer system bus.

The algorithms and displays presented herein are not inherently related to a particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to a particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device of a memory sub-system;
   a processing device of the memory sub-system, coupled with the memory device, to:

receive a first address from a host external to the memory sub-system;

provide the first address to a memory management unit (MMU) of the host for translation;

receive a second address from the MMU wherein the second address is translated from the first address; and access the memory device utilizing the second address.

2. The system of claim 1, wherein the processing device is configured to receive the first address from a virtual computing instance executed on the host.

3. The system of claim 2, wherein the virtual computing instance is a virtual machine (VM) executed on the host.

4. The system of claim 2, wherein the virtual computing instance is a container executed on the host.

5. The system of claim 2, wherein the processing device is further configured to identify a queue, of the system, corresponding to the virtual computing instance.

6. The system of claim 5, wherein the processing device is further configured to identify a process address space identifier (PASID) corresponding to the virtual computing instance utilizing the queue.

7. The system of claim 6, wherein the processing device configured to provide the first address to the MMU is further configured to provide the first address and the PASID to the MMU for translation of the first address, wherein the processing device is further configured to modify the first address utilizing the PASID.

8. The system of claim 7, wherein the processing device is further configured to provide the first address to the MMU for translation, wherein the translation is performed utilizing the PASID.

9. The system of claim 7, wherein the processing device is further configured to modify the first address utilizing the PASID and a memory sub-system identifier (ID) corresponding to the system.

10. The system of claim 9, wherein the processing device is further configured to provide the first address to the MMU for translation, wherein the translation is performed utilizing the PASID and the memory sub-system ID.

11. A non-transitory computer-readable storage medium comprising instructions that, when executed by a processing device, cause the processing device to:

initiate a process in a virtual computing instance hosted by a host external to a memory sub-system;

provide a request to a memory management unit (MMU) for a process address space identifier (PASID) corresponding to the process;

receive from the MMU and at the guest operating system (OS) the PASID responsive to providing the request; and register the PASID with the memory sub-system, wherein the guest OS registers the PASID.

12. The non-transitory computer-readable storage medium of claim 11, wherein the instructions are further executable by the processing device to cause the processing device to receive the PASID from the MMU.

13. The non-transitory computer-readable storage medium of claim 11, wherein the instructions are further executable by the processing device to cause the processing device to provide the request directly to the MMU.

14. The non-transitory computer-readable storage medium of claim 11, wherein the instructions are further executable by the processing device to cause the processing device to provide the request to the MMU without the request being processed by the host prior to delivering the request to the MMU.

15. The non-transitory computer-readable storage medium of claim 11, wherein the instructions are further executable by the processing device to cause the processing device to register the PASID with a PASID table of the memory device.

16. A method comprising:

registering a process address space identifier (PASID) received from a virtual computing instance;

responsive to receipt of an access command, at a memory sub-system, associated with a first address, providing a request to a memory management unit (MMU) of a host external to the memory sub-system for address translation utilizing the first address provided by the virtual computing instance and the PASID;

receiving at the memory sub-system a second address from the MMU responsive to providing the request; and returning the second address to a virtual computing instance and from the memory sub-system, responsive to receipt of the command.

17. The method of claim 16, wherein registering the PASID further comprises storing the PASID in a PASID table.

18. The method of claim 17, further comprising, responsive to receipt of the command, retrieving the PASID from the PASID table prior to providing the request including the PASID.

19. The method of claim 16, further comprising:

storing the second address; and responsive to receipt of additional access commands associated with the first address, returning the second address without providing additional requests to the MMU.

* * * * *